Figure 1:
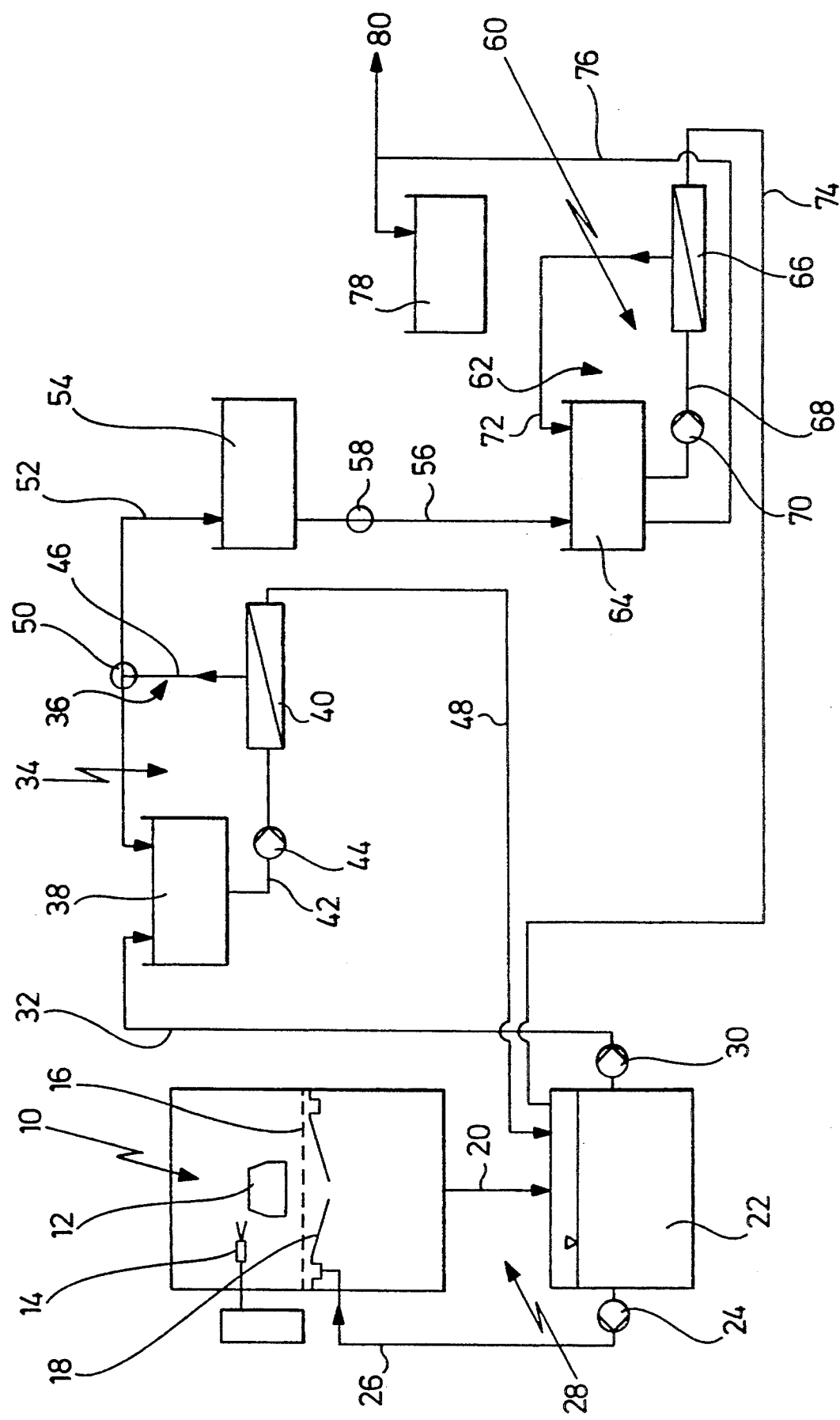

United States Patent [19]

Bhatnagar et al.

[11] Patent Number: 5,443,738
[45] Date of Patent: Aug. 22, 1995

[54] RECOVERY PLANT FOR SURPLUS WATER PAINT

[75] Inventors: Satpal Bhatnagar, Vaihingen; Hans-Ulrich Frey, Fellbach; Juergen Weschke, Weil der Stadt, all of Germany

[73] Assignee: Duerr GmbH, Stuttgart, Germany

[21] Appl. No.: 9,562

[22] Filed: Jan. 26, 1993

[30] Foreign Application Priority Data

Jan. 30, 1992 [DE] Germany .................. 42 02 539.7

[51] Int. Cl.⁶ .............................................. B01D 61/04
[52] U.S. Cl. .................... 210/641; 210/651; 210/259
[58] Field of Search .............. 210/167, 195.2, 651, 210/652, 641, 650, 259

[56] References Cited

U.S. PATENT DOCUMENTS

| | | |
|---|---|---|
| 3,528,901 | 9/1970 | Wallace et al. |
| 3,856,569 | 12/1974 | Strong .................. 210/651 X |
| 4,222,874 | 9/1980 | Connelly .................. 210/650 |
| 5,009,789 | 4/1991 | Helmer et al. .............. 210/195.2 X |
| 5,164,092 | 11/1992 | Munch .................. 210/641 |

FOREIGN PATENT DOCUMENTS

| | | |
|---|---|---|
| 2353469 | 3/1976 | Germany . |
| 3116942 | 11/1982 | Germany . |
| 3227227 | 2/1984 | Germany . |
| 3428300 | 2/1986 | Germany . |
| 0197085 | 12/1982 | Japan .................. 210/641 |

*Primary Examiner*—Frank Spear
*Attorney, Agent, or Firm*—Barry R. Lipsitz

[57] ABSTRACT

To provide a recovery plant for surplus water paint in paint-spraying booths comprising a circuit of water circulating in the booth, wherein such problems with sedimenting water paint particles no longer arise, it is proposed that a volume flow of water circulating in the booth flow from the circuit of water circulating in the booth through a branch pipe to a preconcentration stage, that the preconcentration stage comprise a ring circuit with an ultrafiltration unit for continuously producing a preconcentrate in the ring circuit and a permeate which leaves the ring circuit, that the permeate flow into the circuit of water circulating in the booth and the preconcentrate into a final concentration stage, that the final concentration stage comprise a ring circuit with an ultrafiltration unit which increases the concentration of the preconcentrate in batches to the final concentrate and produces a permeate which flows into the circuit of water circulating in the booth.

14 Claims, 3 Drawing Sheets

RECOVERY PLANT FOR SURPLUS WATER PAINT

The invention relates to a recovery plant for surplus water paint in paint-spraying booths comprising a circuit of water circulating in the booth, in particular, with a system tank for collecting the water circulating in the booth.

The invention also relates to a method for the recovery of surplus water paint in paint-spraying booths in which water circulating in the booth is conducted through a circuit and, in particular, collected in a system tank.

It is known to collect the surplus water paint in paint-spraying booths by means of the water circulating in the booth and to thereby wash it out of the paint-spraying booth. The solids component in the circuit of water circulating in the booth increases constantly owing to this washing-out of the surplus water paint. From a certain concentration onwards of the solids component in the circuit of water circulating in the booth, the circulation is no longer adequate to keep the solids component, i.e., the water paint particles suspended and so sedimentation of the solids component starts in critical parts of the circuit of water circulating in the booth. It is then no longer expedient to maintain the washing-out of the surplus water paint in the paint-spraying booth and a number of problems arise as a result of the sedimented water paint particles.

The object underlying the invention is, therefore, to provide a recovery plant for surplus water paint in paint-spraying booths wherein such problems with sedimenting water paint particles no longer occur.

This object is accomplished in accordance with the invention in a recovery plant of the kind described above by a volume flow of water circulating in the booth flowing from the circuit of water circulating in the booth through a branch pipe to a preconcentration stage, by the preconcentration stage comprising a ring circuit with an ultrafiltration unit for continuously producing a preconcentrate in the ring circuit and a permeate which leaves the ring circuit, by the permeate flowing into the circuit of water circulating in the booth and the preconcentrate into a final concentration stage, by the final concentration stage comprising a ring circuit with an ultrafiltration unit which increases the concentration of the preconcentrate in batches to the final concentrate and produces a permeate which flows into the circuit of water circulating in the booth.

In a two-stage process in accordance with the inventive solution the surplus water paint collected in the water circulating in the booth is removed in the preconcentration stage preferably on average continuously from the circuit of water circulating in the booth and increased in concentration to the preconcentrate with a solids content of, for example, 1 to 10%, preferably approximately 5%, and this preconcentrate is simultaneously fed to the final concentration stage in which the preconcentrate is increased in concentration in batches to the final concentrate which has a solids concentration which is necessary foe it to be usable as recycling paint.

The great advantage of the preconcentration stage which essentially operates on average continuously is to be seen in the fact that with the constant output of permeate from the preconcentration stage, the solids content in the circuit of water circulating in the booth can also be kept at an essentially constant value of, for example, 0.1 to 1.0%, preferably approximately 0.2 to 0.5%, as the preconcentration stage operates with essentially constant parameters, i.e., an essentially constant solids content. Furthermore, the preconcentration stage produces essentially continuously a concentrate which is increased in concentration in the final concentration stage in batches to the final concentrate with a solids content of, for example, 20 to 50%, preferably 40 to 50% in the case of filler and finishing paint. The increasing of the concentration in batches has, in turn, the advantage that without having to take into consideration the permeate output of the final concentration stage, the final concentrate can be increased in concentration to a solids content which is merely aimed at advantageous paint characteristics of the recycling paint.

To enable batch-type operation of the final concentration stage, provision is made in an advantageous embodiment of a recovery plant according to the invention for an intermediate buffer tank to be provided to temporarily store the preconcentrate flowing off from the preconcentration stage and feed it in batches to the final concentration stage. With this intermediate buffer tank the connection is thus made between the essentially constantly operating preconcentration stage and the final concentration stage, with no large volumes having to be temporarily stored in this intermediate buffer tank because due to the preconcentration stage, the volume flow entering the intermediate buffer tank constitutes a small part of that volume flow of water circulating in the booth which enters the preconcentration stage.

As an alternative to this, provision is made in a further advantageous embodiment of a recovery plant according to the invention for two final concentration stages to be provided for alternately receiving preconcentrate. In this embodiment, the intermediate buffer tank can be dispensed with, and the final concentration stages then operate in such a way that one is always being charged with preconcentrate while the other one is increasing the concentration of the charged batch of preconcentrate to the final concentrate.

In the simplest case, provision is made in the recovery plant according to the invention for the permeate of the final concentration stage to flow back directly into the circuit of water circulating in the booth. When the recovery plant according to the invention is in operation for a long time, this can result in low-molecular water paint components which are still present in the permeate being increased in concentration in the circuit of water circulating in the booth as they are not removed to the same extent as the solids component of the water paint in the final concentration stage.

To prevent such increasing of the concentration of low-molecular water paint components, provision is preferably made for the permeate of the final concentration stage to pass prior to entry into the circuit of water circulating in the booth through a reverse osmosis stage which removes low-molecular water paint components.

With this reverse osmosis stage it is thus possible to also remove the low-molecular water paint components contained in the permeate, in particular, the permeate of the final concentration stage and to feed the permeate produced by the reverse osmosis stage which is now essentially free of low-molecular water paint components to the circuit of water circulating in the booth and thereby bring about dilution of the water circulating in the booth also with respect to the low-molecular water paint components.

At the same time the reverse osmosis stage makes it possible to also recover the low-molecular water paint components again, for example, in a water paint processing installation.

The reverse osmosis stage is preferably designed so as to comprise a ring circuit and a reverse osmosis unit which increases the concentration of low-molecular water paint components in the ring circuit and produces an osmosis permeate which flows into the circuit of water circulating in the booth.

So far, no details have been given about the way in which the preconcentration stage operates. It is, for example, also possible for the preconcentration stage to operate in a clocked manner and to each time increase the concentration of a batch of water circulating in the booth to the preconcentrate. It is, however, more advantageous for the preconcentration stage to continuously take in water circulating in the booth from the branch line.

Furthermore, it is advantageous for the permeate produced by the preconcentration stage to flow continuously into the circuit of water circulating in the booth.

Provision is also advantageously made for the preconcentrate produced by the preconcentration stage to flow off continuously from the preconcentration stage.

In particular, such flowing-off of the preconcentrate proves advantageous when a certain fraction of the preconcentrate circulating in the ring circuit flows off from the preconcentration stage.

Here provision is preferably made for the flowing-off preconcentrate to be retained matter coming from the ultrafiltration unit.

An advantageous balance of the volume flows is achieved when the volume flow of the flowing-off preconcentrate and the generated permeate corresponds to that volume flow of the water circulating in the booth which flows into the preconcentration stage so that the preconcentration stage continously removes water circulating in the booth with a certain solids component from the circuit of water circulating in the booth and continuously feeds circuit permeate to the latter, thereby contributing to a continuous diluting of the water circulating in the booth which, for its part, owing to the washingout of the surplus water paint in the spray booth, is continuously charged with new solids component, in particular water paint particles.

The output of the preconcentration stage is preferably selected such that the mass of solids component removed from the circuit of water circulating in the booth via the preconcentrate flowing off from the preconcentration stage is equal to the mass of solids component which is washed out from the circuit of water circulating in the booth via the surplus water paint.

Finally, the object underlying the invention is accomplished in accordance with the invention in a method of the kind described above by a volume flow of water circulating in the booth being led from the circuit of water circulating in the booth to a preconcentration stage, by the preconcentration stage comprising a ring circuit with an ultrafiltration unit in which a preconcentrate is continuously produced in the ring circuit and a permeate which leaves the ring circuit, by the permeate being fed to the circuit of water circulating in the booth and the preconcentrate to a final concentration stage, by the final concentration stage comprising a ring circuit with an ultrafiltration unit in which the concentration of the preconcentrate is increased in batches to the final concentrate and a permeate is produced and fed to the circuit of water circulating in the booth.

The advantages of the method according to the invention are the same as those of the recovery plant according to the invention and so reference is to be had in this connection to the statements thereon.

Herein it is particularly advantageous for an intermediate buffer to be provided for temporarily storing the preconcentrate flowing off from the preconcentration stage and for feeding the preconcentrate from it in batches to the final concentration stage.

As an alternative to this, it is advantageous in a further embodiment of the method according to the invention for two final concentration stages to be provided for alternately receiving preconcentrate.

Regarding the further use of the permeate of the final concentration stages, it is, on the one hand, possible to lead it back again directly to the circuit of water circulating in the booth, but it is even better for the permeate of the final concentration stage to be conducted prior to entry into the circuit of water circulating in the booth through a reverse osmosis stage for removing low-molecular water paint components.

It is expedient for the reverse osmosis stage to operate in such a way that the permeate is conducted through a reverse osmosis stage in which the concentration of low-molecular water paint components is increased and an osmosis permeate is produced and fed to the circuit of water circulating in the booth.

In the embodiments according to the invention, the preconcentration stage is preferably operated in such a way that permeate is continuously produced and fed to the circuit of water circulating in the booth.

Furthermore, the preconcentration stage can be advantageously operated further in such a way that the generated preconcentrate is continuously removed from the preconcentration stage.

This removal of the preconcentrate preferably takes place by a certain fraction of the preconcentrate circulating in the ring circuit always being removed.

Further features and advantages of the inventive solution are to be found in the following description and the appended drawings of several embodiments.

Figure 2:
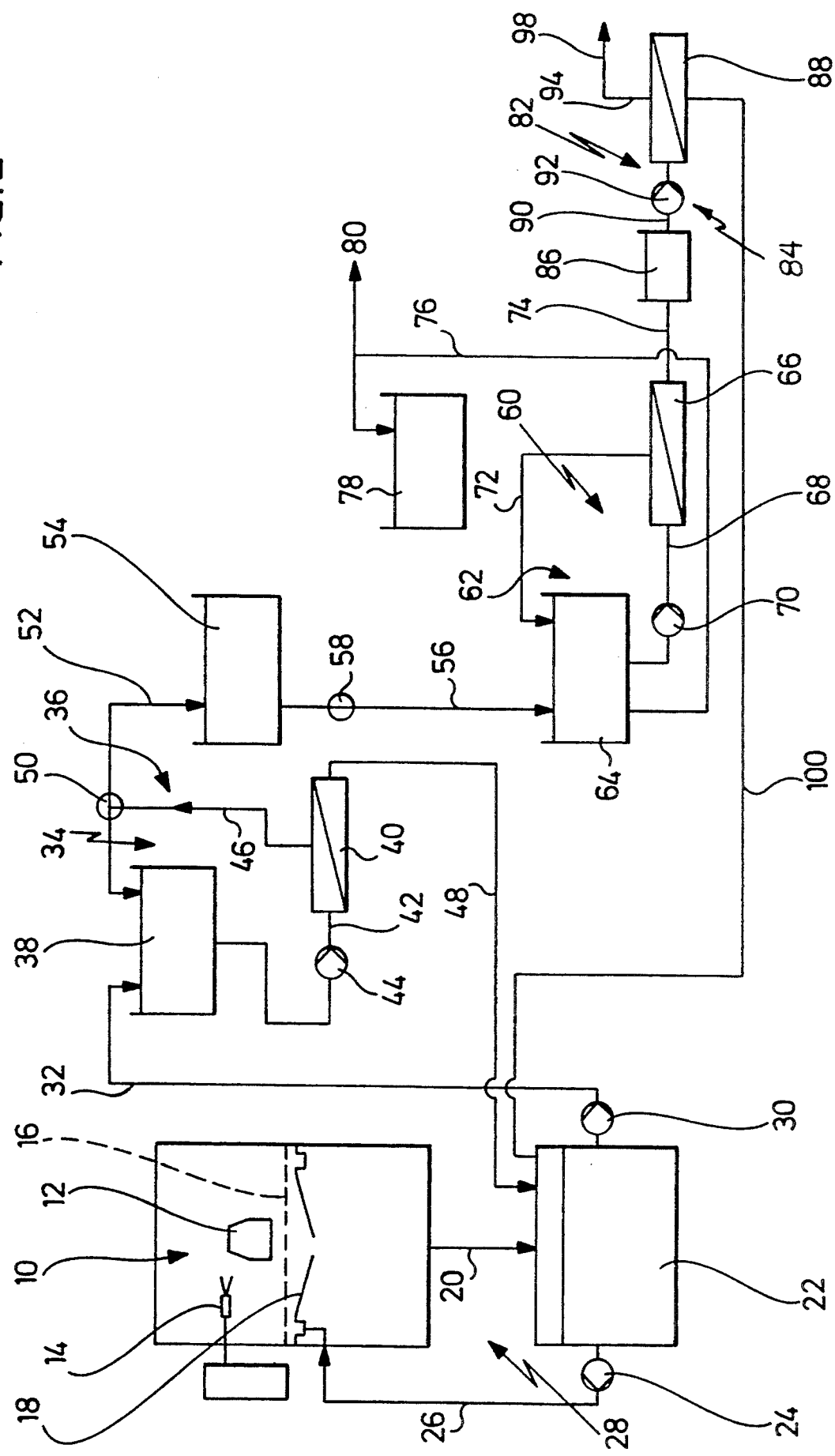

The drawings show:

FIG. 1 a schematic illustration of a first embodiment of a recovery plant according to the invention;

FIG. 2 a schematic illustration of a second embodiment; and

Figure 3:
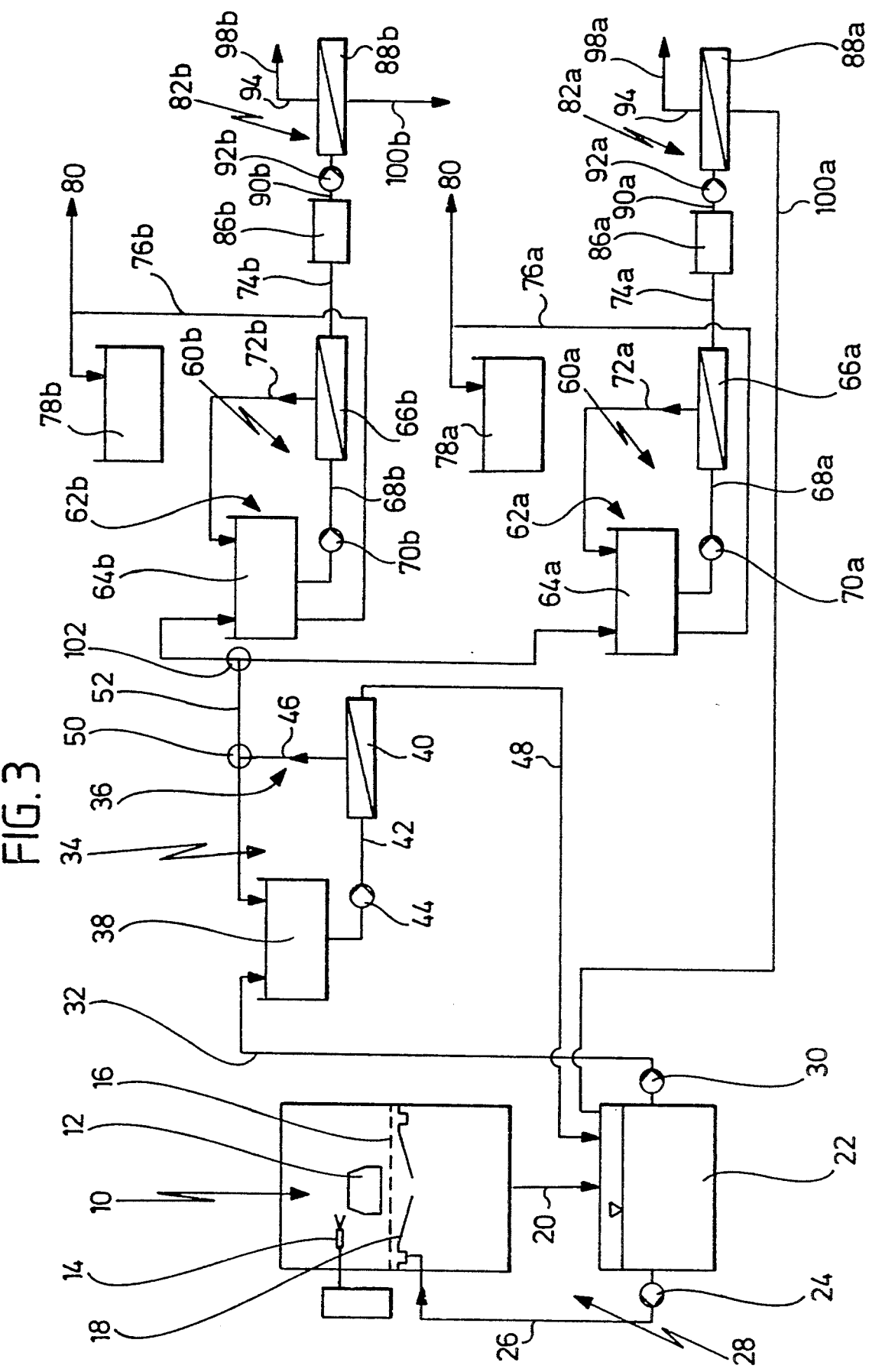

FIG. 3 a schematic illustration of a third embodiment of a recovery plant according to the invention.

An embodiment of a recovery plant according to the invention is used in a spray booth designated in its entirety 10 in which, for example, a motor vehicle body 12 is paintable by spray devices with water paint. The water paint which does not remain on the motor vehicle body 12 is washed out underneath a grating floor 16 as surplus water paint by water circulating in the booth and flowing over a drainage plate 18, collected and fed together with the water circulating in the booth via a discharge pipe 20 to a system tank 22. From this system tank 22 the water circulating in the booth is fed again by a pump 24 through a feed pipe 26 to inlet channels of the drainage plates 18 so that, in all, the water circulating in the booth recirculates in a circuit 28 of water circulating in the booth in order to continuously wash out the surplus water paint from the spray booth 10. The concentration of the solids component thus increases steadily in the circuit 28 of water circulating in the booth. However, this should not exceed a certain value in order to prevent sedimentation of the dispersed water paint in critical parts of the circuit of water circulating in the booth.

For this reason, a volume flow of water circulating in the booth is branched off by a pump 30 through a branch pipe 32 from the circuit 28 of water circulating in the booth and fed to a preconcentration stage designated in its entirety 34. This preconcentration stage 34 comprises a ring circuit designated 36 with a circuit tank 38, a filter feed pipe 42 leading from the circuit tank 38 to an ultrafiltration unit 40, a pump 44 arranged in the filter feed pipe and a pipe 46 for retained matter leading back from the ultrafiltration unit 40 to the circuit tank. A permeate pipe 48 also leads away from the ultrafiltration unit 40 and back into the system tank 22.

In the preconcentration stage 34 according to the invention, the branch pipe 32 preferably discharges into the circuit tank 38 of the ring circuit 36.

The pipe 46 for retained matter also contains a branch-off valve 50, preferably a proportional valve, which branches off an adjustable amount of the volume flow in the pipe 46 for retained matter and introduces it through a preconcentrate pipe 52 into an intermediate buffer tank 54.

A feed pipe 56 with a shut-off valve 58 arranged in it leads from the intermediate buffer tank 54 to a final concentration stage 60 which likewise comprises a ring circuit 62 with a circuit tank 64, a filter feed pipe 68 with a pump 70 leading to an ultrafiltration unit 66 and a pipe 72 for retained matter leading back from the ultrafiltration unit 66 to the circuit tank 64.

The permeate produced in the ultrafiltration unit 66 is, in turn, fed directly through a permeate pipe 74 to the system tank 22.

A discharge pipe 76 is also provided for emptying the circuit tank 64 and leads either to a paint buffer tank 78 or to a paint processing device 80.

The inventive recovery plant for water paint surplus operates as follows:

First, it will be assumed that in the circuit 28 of water circulating in the booth, the water circulating in the booth is constantly taking up and washing out new surplus water paint from the spray booth 10. This results in an increase of the content of solids in the entire circuit 28 of water circulating in the booth to values of approximately 0.1 to 1%, preferably 0.2 to 0.5%.

In order to keep this concentration of the solids, which cannot be measured, substantially constant in the system tank 22, the preconcentration stage 34 operates continuously, i.e., the water circulating in the booth which is fed to the ring circuit 36 by the pump 30 and the branch pipe 32 is constantly increased in concentration with water paint particles in the ring circuit 36 in order to produce in the ring circuit 36 a preconcentrate which has, for example, a solids content of 1 to 10%, preferably approximately 5%. Owing to the water which circulates in the booth being continuously recirculated in the ring circuit 36 with water paint particles, the ultrafiltration unit continuously separates permeate and feeds it through the permeate pipe 48 back into the system tank 22. Furthermore, the branch-off valve 50—as described previously—operates in such a way that always a certain amount of the volume flow in the pipe 46 for retained matter is branched off and flows through the preconcentrate pipe 52 into the intermediate buffer tank 54. The amount is, for example, 1/20 of the volume flow in the pipe 46 for retained matter in the ring circuit 36.

In order to keep the volume of the water circulating in the booth with paint particles constant in the ring circuit 36, the volume flow of the permeate flowing off through the permeate pipe 48 and the volume flow of the preconcentrate flowing off through the preconcentrate pipe 52 are continuously replaced by water circulating in the booth with water paint particles with preferably a solids content of 0.2 to 0.5% being fed by the pump 30 and the branch pipe 32.

The volume flow through the branch pipe 32 is controllable, for example, in accordance with the filling level in the circuit tank 38.

The first preconcentration stage 34 thus serves to continuously remove from the circuit 28 of water circulating in the booth a volume flow of water circulating in the booth with water paint particles and to replace this volume flow essentially by the permeate fed back through the permeate pipe 48 so that, in turn, the entire water circulating in the booth is thereby continuously diluted and, therefore, the component of solids introduced through the circuit 28 of water circulating in the booth is, in principle, removed by the volume flow through the branch pipe 32.

The preconcentrate introduced by the preconcentrate pipe 52 into the intermediate buffer tank 54 is now temporarily stored in it and fed by means of the shut-off valve 58 in the feed pipe in batches to the circuit tank 64 of the ring circuit 62 of the final concentration stage 60, i.e., the final circuit 62 is charged at constant time intervals with a new batch of preconcentrate.

Once the ring circuit 62 has been charged, the preconcentrate in this ring circuit 62 is constantly circulated and thus passes continuously through the ultrafiltration unit 66 which constantly separates permeate from the circulated preconcentrate and feeds it, in turn, to the system tank 22 through the permeate pipe 74.

An increase in the concentration of the preconcentrate thus takes place in the ring circuit 62, more particularly, up to a solids content of from approximately 20 to approximately 50% depending on the type of paint in the final concentrate. When this solids concentration is reached and the final concentrate thus produced, the circuit tank 64 is emptied and the ring circuit 62, too, through the discharge pipe 76 either into the paint buffer tank 78 or directly into the paint processing device 80.

The now empty circuit tank 64 is then charged anew through the feed pipe 56 with a further batch of preconcentrate which is then likewise increased in concentration in the ring circuit 62 to final concentrate.

In a second embodiment of an inventive recovery plant for surplus water paint those parts which are identical with those of the first embodiment bear the same reference numerals. For a description of their arrangement and function reference may be made to the above description of the first embodiment.

In contrast with the first embodiment, the permeate pipe 74 does not lead back directly to the system tank but via a reverse osmosis stage 82 which comprises a work tank 86, a reverse osmosis unit 88, a feed pipe 90 with a pump 92 leading from the work tank 86 to the reverse osmosis unit 88 and a pipe 94 for retained matter leading away from the reverse osmosis unit 88. Furthermore, the pipe 94 for retained matter leads via an outlet 98, for example, into a storage tank or into the paint processing device 80. An osmosis permeate pipe 100 also leads back from the reverse osmosis unit 88 to the system tank 22.

In contrast with the first embodiment, in the second embodiment the permeate of the ultrafiltration unit 66 is not fed directly through the permeate pipe 74 into the system tank but instead into the reverse osmosis stage 82. Herein, the permeate is circulated in the ring circuit 84 and low-molecular paint components such as, for example, low-molecular binding agents and low-molecular solvents still present in the permeate are held back by the reverse osmosis unit 88 and circulated in the pipe 94 for retained matter, while the water flows back through the osmosis permeate pipe 100 to the system tank 22.

In the ring circuit 84 of the reverse osmosis stage 82 the low-molecular water paint components are thus increased in concentration and passed on through the outlet 98 for regeneration, either directly in the paint processing device 80 or by temporary storage in a tank.

Furthermore, owing to the reverse osmosis stage 82 the concentration of the low-molecular water paint components in the circuit 28 of water circulating in the booth is prevented from increasing in the course of time and hence the solids component, i.e., the component of water paint particles, from being unable to be kept suspended to an adequate extent in the circuit of water circulating in the booth.

Owing to the pure water flowing back through the osmosis permeate pipe 100, a constant diluting with respect to the low-molecular water paint components is, therefore, also brought about in the circuit of water circulating in the booth.

In the first and second, embodiments, the ultrafiltration units 40 and 66 preferably operate with membranes which have a separating limit in the range of from approximately 10,000 to approximately 100,000 dalton, while the reverse osmosis unit 88 operates with a membrane having a separating limit which lies in the range of from approximately 100 dalton to approximately 200 dalton.

In a third embodiment of a recovery plant according to the invention, illustrated in FIG. 3, those parts which are identical with those of the first and second embodiments bear the same reference numerals and so reference is to be had in connection with their arrangement and function to the statements on the first two embodiments.

In contrast with the first and second embodiments, two final concentration stages 60a and 60b are provided. These operate in the same way as the final concentration stage 60 and, in addition, a reverse osmosis stage 82a and 82b, respectively, is also connected to the outlet side of each of the final concentration stages 60a and 60b.

The advantage of the third embodiment includes the fact that the intermediate buffer tank 54 can be dispensed with. Instead of the intermediate buffer tank 54, a shift valve 102 which introduces the preconcentrate into either the circuit tank 64a or the circuit tank 64b is arranged in the preconcentrate pipe 52.

The two final concentration stages 60a and 60b operate in such a way that either the final concentration stage 60a or the final concentration stage 60b is charged and the respective other one 60b or 60a increases the concentration of the charged batch to the final concentrate.

The preconcentrate is thus continuously removed from one of the final concentration stages 60a or 60b.

The osmosis permeate pipes 100a and 100b preferably likewise lead back into the system tank 22 again so that—as described previously—the water circulating in the booth is constantly diluted to an adequate extent and no increasing of the concentration of low-molecular water paint components takes place in it.

The present disclosure relates to the subject matter disclosed in German application No. P 42 02 539.7 of Jan. 30, 1992, the entire specification of which is incorporated herein by reference.

What is claimed is:

1. Apparatus for recovering surplus water paint from a paint-spraying booth, comprising:
    a booth water circuit in which booth water circulates between a drain of said paint-spraying booth and a system tank;
    a branch pipe for continuously removing booth water from said booth water circuit and feeding it to a preconcentration ring circuit of a continuously operating preconcentration stage;
    an ultrafiltration unit for continuously producing a preconcentrate in said preconcentration ring circuit and for continuously producing a permeate;
    a pipe for continuously guiding said permeate from said ultrafiltration unit to said booth water circuit;
    a branch element in said preconcentration ring circuit for removing part of said preconcentrate and introducing it into a ring circuit of a final concentration stage;
    said ring circuit of said final concentration stage including an ultrafiltration unit for increasing concentration of the preconcentrate in batches to a final concentrate for output from said recovering apparatus, said ultrafiltration unit also producing a permeate.

2. A recovery plant as defined in claim 1, further comprising an intermediate buffer tank for temporarily storing the preconcentrate flowing off from the preconcentration stage and feeding it in batches to the final concentration stage.

3. A recovery plant as defined in claim 1, wherein two final concentration stages are provided for alternately receiving preconcentrate.

4. A recovery plant as defined in claim 1, wherein the permeate of the final concentration stage flows back directly into the circuit of water circulating in the booth.

5. A recovery plant as defined in claim 1, wherein the permeate of the final concentration stage passes through a reverse osmosis stage for removing low-molecular water paint components before entering the circuit of water circulating in the booth.

6. A recovery plant as defined in claim 5, wherein the reverse osmosis stage comprises a ring circuit and a reverse osmosis unit which increases the concentration of low-molecular water paint components and produces an osmosis permeate which flows into the circuit of water circulating in the booth.

7. A recovery plant as defined in claim 1, wherein a certain fraction of the preconcentrate circulating in the ring circuit flows off from the preconcentration stage.

8. A recovery plant as defined in claim 7, wherein the preconcentrate which flows off is retained matter coming from the ultrafiltration unit.

9. A method for the recovery of surplus water paint from a paint-spraying booth, comprising the steps of:
    circulating booth water in a booth water circuit between a drain of said booth and a system tank;

removing booth water from said booth water circuit and feeding it into a preconcentration ring circuit of a continuously operating preconcentration stage;

producing a preconcentrate in said preconcentration ring circuit by ultrafiltration;

continuously producing a permeate by said ultrafiltration and feeding said permeate into said booth water circuit;

continuously removing part of said preconcentrate from said ring circuit and feeding it into a ring circuit of a concentration stage;

keeping a concentration of solids in said booth water circuit essentially constant through said removing of said booth water from said booth water circuit, said feeding of said permeate back into said booth water circuit and said continuous removing of part of said preconcentrate; and ultrafiltering said preconcentrate in said concentration stage to produce a permeate and to increase the concentration of the preconcentrate in batches to a final concentrate for output as recovered water paint.

10. A method as defined in claim 9, wherein the preconcentrate flowing off from the preconcentration stage is temporarily stored and fed in batches to the final concentration stage.

11. A method as defined in claim 9, wherein two final concentration stages are provided for alternately receiving preconcentrate.

12. A method as defined in claim 9, wherein the permeate of the final concentration stage is fed back directly into the circuit of water circulating in the booth.

13. A method as defined in claim 9, wherein the permeate of the final concentration stage is led through a reverse osmosis stage for removing low-molecular water paint components before entering the circuit of water circulating in the booth.

14. A method as defined in claim 13, wherein in the reverse osmosis stage:

the concentration of low-molecular water paint components is increased; and an osmosis permeate is produced and fed to the circuit of water circulating in the booth.

* * * * *